3,271,001
QUICK ACTING VALVE
Per Gloersen, Levittown, Bernard Gorowitz, Elkins Park, and Kenneth G. Moses, Philadelphia, Pa., assignors to General Electric Company, a corporation of New York
Original application Aug. 18, 1959, Ser. No. 834,574, now Patent No. 3,151,259, dated Sept. 29, 1964. Divided and this application July 23, 1963, Ser. No. 304,710
1 Claim. (Cl. 251—139)

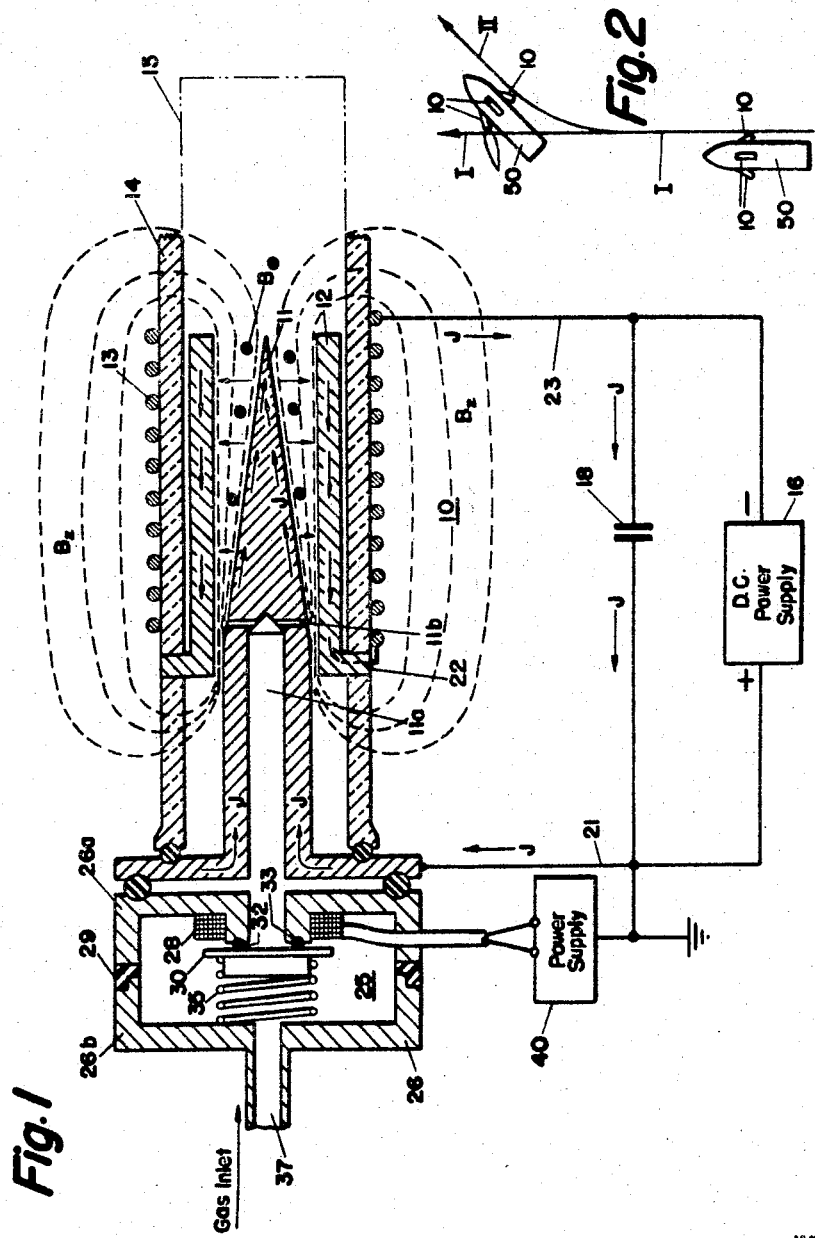

This invention pertains to the construction and use of quick-acting valves, and particularly to such valves as are adapted to be opened or closed responsively to the application thereto of electrical impulses. This application for United States patent is a division of our parent application Serial No. 834,574, filed August 18, 1959, for Plasma Accelerator System, now Patent No. 3,151,259.

In accordance with a particular aspect of the parent invention there is provided in a plasma accelerator the sub-combination of an electrode having a passage therethrough and a valve plate disposed over the passage. A sealing means in the form of a ring surrounds the passage and is disposed between the electrode and the valve plate. The valve plate is normally held against the sealing means by means of a spring for producing a biasing force on the valve plate to close the passage in the electrode. A coil surrounds the passage and is disposed adjacent the valve plate for producing a repulsion force on the plate to move it away from the passage in opposition to the biasing force so as to permit gas to enter the passage through the electrode.

For a more detailed disclosure of the invention and for further objects and advantages thereof, reference is to be had to the following description taken in conjunction with the accompanying drawings in which:

FIG. 1 is a schematic view of a system embodying the present invention; and

FIG. 2 is an explanatory view showing the parent invention as applied to spacecraft attitude control or the like.

Referring to FIG. 1, the plasma accelerator system 10 includes an electrode 11 which is conical in shape and a cylindrical electrode 12 which surrounds the conical electrode 11 and forms a radial gap therebetween. The electrodes 11 and 12, which are made from suitable metal such as copper or brass, are adapted to be supported in spaced relation by any suitable means and the outer electrode 12 is surrounded by an electric coil or winding 13 having a plurality of turns. The coil 13 is electrically insulated from the cylindrical electrode 12 by suitable means such as a glass sleeve 14.

In operation, at least the electrode-gap of the accelerator 10 is adapted to be subjected to very low pressures. This condition, normally present in outer space, may be produced for the purposes of laboratory testing by suitable means, such as a vacuum pumping system providing an evacuated region indicated by phantom lines 15.

The accelerator 10 is provided with a D.C. power supply 16 and in the preferred embodiment, the driving coil 13 and the radio discharge gap between electrodes 11 and 12 are connected in series. One or more capacitors 18 are adapted to be charged by the power supply 16, and with it provide a suitable high-voltage, high-current source for the accelerator 10. The power supply 16 for charging the capacitor 18 may be of any suitable high-voltage D.C. type and may include a current limiting resistor or it may provide pulse-charging through an inductor, the latter arrangement being desirable, since it substantially eliminates ohmic heating losses in the charging circuit. The capacitors 18 are adapted to be discharged across the radial gap. The resulting current flow, as indicated by J, is through conductor 21 along the inner electrode 11 across the radial gap to the cylindrical electrode 12 and thence by way of the metal-supporting flange 22 through the coil 13, and back through conductor 23. With circuit parameters affording critical damping, the discharge current traversing the gap and exciting the coil 13 is a single unidirectional pulse.

The shape of the electrodes 11 and 12 and the position of the coil 13 are such that two forces will be operative in expelling the plasma from the discharge end of the accelerator into outer space or other evacuated region 15. The first of these is in the nature of a magnetohydrodynamic pressure and is created in an axial direction by reason of the interaction of both the magnetic field $B_Z$ due to passage of current through the coil 13 and the field $B_\theta$ due to three other currents with the plasma created between the electrodes. These are (1) the axial currents in both electrodes 11 and 12; (2) the ring current in the plasma caused by the $v \times B_Z$ electric field where $v$ is the velocity of the radial motion of the charge carriers in the plasma; and (3) the ring current induced in the plasma by the time variation of the magnetic field $B_Z$. Magnetohydrodynamic effects are described in a publication entitled "Magnetohydrodynamics" by Cowling and in a publication entitled "Physics of Fully Ionized Gases" by Spitzer, both of which are published by Interscience Publishers, Inc.

It is important that the magnetic field $B_Z$ diverge throughout the entire region occupied by the plasma in order that the magnetic energy may be coupled to all of the plasma for optimum efficiency. If the magnetic field were diverging in only a portion of such region, then only a corresponding portion of the plasma would be accelerated by this means resulting in a very low efficiency typical of prior accelerators.

The second force which contributes to expelling the plasma from the accelerator is due to the pressure gradients on the gas derived from the ohmic heating due to the currents induced in the plasma by the time-varying magnetic fields $B_Z$ and $B_\theta$ and to the radial discharge current.

The electrode 11 is provided with an internal passage 11a which extends axially of the electrode 11 and terminates in a series of small radial ports 11b which extend around the circumference of the electrode 11 near the throat end of the axially diverging gap between the electrodes. A suitable gas such as nitrogen, argon, hydrogen or helium is adapted to be introduced into the radial gap from passage 11a by way of a valve 25. Air may also be used as a fuel; however, small mass materials, such as hydrogen or helium, are accelerated more readily than heavier ones. Since the principle of the accelerator is to provide a large exhaust momentum by providing a very large velocity to a small mass, the use of low atomic mass material is preferred. The valve 25 comprises a housing 26 which is adapted to be supported at the rear of the electrode 11. The axial passage 11a is adapted to be surrounded by a field coil 28. The housing 26 is adapted to be mounted on the end of the electrode 11 and preferably is divided into two sections 26a and 26b which are sealed together by a rubber gasket 29. A spring 35 supports a valve plate or disc 30 in centered relation with respect to the passage 11a in electrode 11. The valve seat around the passage 11a is provided by a sealing member 32 which is disposed within a groove 33. The sealing member 32 is preferably in the form of an O-ring made from Teflon and the valve plate 30 is adapted to be held against the sealing ring 32, by means of a biasing force produced by the coil spring 35. The valve plate 30 is shown in the form of a round disc and is momentarily opened by pulse-exciting the coil 28. This induces eddy currents in the plate 30 causing a repeated repulsion of the plate 30 away from the coil 28 and seat 32.

In a typical embodiment, the field coil 28 of the valve was made from copper ribbon and embedded in porcelain cement to prevent electrical breakdown and to avoid deformation and movement due to its internal magnetic fields. The valve plate 30 was made from highly polished brass to which was soldered the spring 35 which is made from steel. The valve seat 32 was a Teflon O-ring and the groove 32 was highly polished. The energy for the valve opening was provided by a power supply 40 which included a 10 kv., 3 µf. G.E. capacitor, charged from 4.5–8 kv. Its discharge was triggered by a three-electrode air gap whose breakdown was initiated by the timed spark of a 15 kv. pulse generator.

From the above description, it will be recalled that the radial gap and the driving coil 13 were connected in series circuit with the power supply 16. With this arrangement, and by introducing the gas through ports 11b in the radial gap between the electrodes 11 and 12, the accelerator 10 is triggered automatically and internally and thus there is eliminated the external triggering losses due to the energy used in external switching. The valve 25 permits the gas to be introduced in pulses which may be controlled to a very short duration of substantially less than 60 microseconds. Since the evacuated gap of accelerator 10 is capable of holding off the potential of the charged capacitors 18, the pulsed admission of the gas provides a necessary ionizing medium to trigger the discharge and produce a mass of the plasma which is expelled axially to the right of the accelerator 10.

A plurality of accelerators are adapted to be mounted on a space vehicle 50 as shown in FIG. 2. The position of the vehicle 50 may be changed with respect to its normal flight path by operating one or more of its plasma accelerators 10 to obtain the required corrective impulse.

As shown, the vehicle 50 has changed its flight path from path I to path II.

While there has been described a preferred embodiment of the invention, it will be understood that further modifications may be made without departing from the spirit and scope of the invention as set forth in the appended claim.

What is claimed is:

A quick-acting valve comprising:
a member having a passage therethrough;
a flat electrically conductive plate disposed over the said passage;
sealing means disposed between the said member and the said plate;
force means for producing a biasing force on the said plate to hold the plate against the sealing means to close the said passage;
a magnetizing coil surrounding the said member and positioned to produce, by passage of current through the said coil, a magnetic field to impinge on the said electrically conductive plate and induce therein eddy currents to interact with the said magnetic field to overcome the said biasing force and thereby to open the said passage.

References Cited by the Examiner

UNITED STATES PATENTS

| | | | |
|---|---|---|---|
| 2,608,376 | 8/1952 | Adams | 137—516.29 |
| 2,637,343 | 5/1953 | Matthews | 251—139 X |
| 2,791,394 | 5/1957 | Matthews | 251—139 X |

R. J. MILLER, *Assistant Examiner.*

M. CARY NELSON, *Primary Examiner.*

MARTIN P. SCHWADRON, *Examiner.*